United States Patent

Kato et al.

[11] Patent Number: 5,084,329
[45] Date of Patent: Jan. 28, 1992

[54] CERAMIC JOINED BODY

[75] Inventors: Shigeki Kato, Nagoya; Katsuhiro Inoue, Aichi, both of Japan

[73] Assignee: NGK Insulators, Ltd., Japan

[21] Appl. No.: 454,394

[22] Filed: Dec. 21, 1989

[30] Foreign Application Priority Data

Dec. 21, 1988 [JP] Japan .................. 63-322857

[51] Int. Cl.⁵ .............................................. F01D 5/04
[52] U.S. Cl. ....................... 428/212; 416/241 B; 416/244 A; 428/446; 428/688; 428/698
[58] Field of Search ............... 428/688, 698, 212, 446; 228/121, 122; 416/241 B, 244 A

[56] References Cited

U.S. PATENT DOCUMENTS

| 4,396,445 | 8/1983 | Sasaki et al. ............... 156/89 |
| 4,544,327 | 10/1985 | Kato ........................ 416/241 B |
| 4,579,703 | 4/1986 | Adlerborn et al. ........... 416/241 B |
| 4,701,106 | 10/1987 | Sasaki ...................... 416/241 B |
| 4,723,862 | 2/1988 | Ito et al. .................. 416/241 B |
| 4,749,334 | 6/1988 | Byrne ....................... 416/244 A |
| 4,784,574 | 11/1988 | Tsuno et al. ................ 416/241 |
| 4,942,999 | 7/1990 | Oda et al. .................. 228/124 |

FOREIGN PATENT DOCUMENTS 3816025 12/1988 Fed. Rep. of Germany .

Primary Examiner—Patrick J. Ryan
Assistant Examiner—Archene Turner
Attorney, Agent, or Firm—Parkhurst, Wendel & Rossi

[57] ABSTRACT

A ceramic jointed body composed of two molded bodies which are individually molded by different methods, respectively, and integrally jointed by isostatic pressing, wherein a difference between "amounts of spring back" of the two molded bodies satisfies the formula $$|\Delta S_B| \leq \frac{20}{D}$$

thereby preventing cracks from occurring in the jointed body.

3 Claims, 4 Drawing Sheets

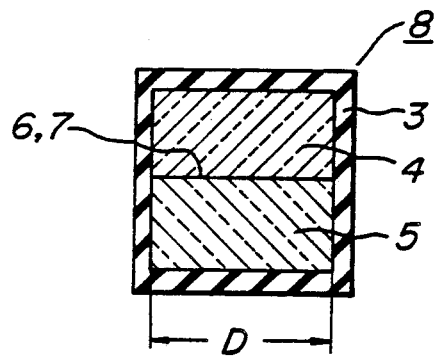
FIG_2
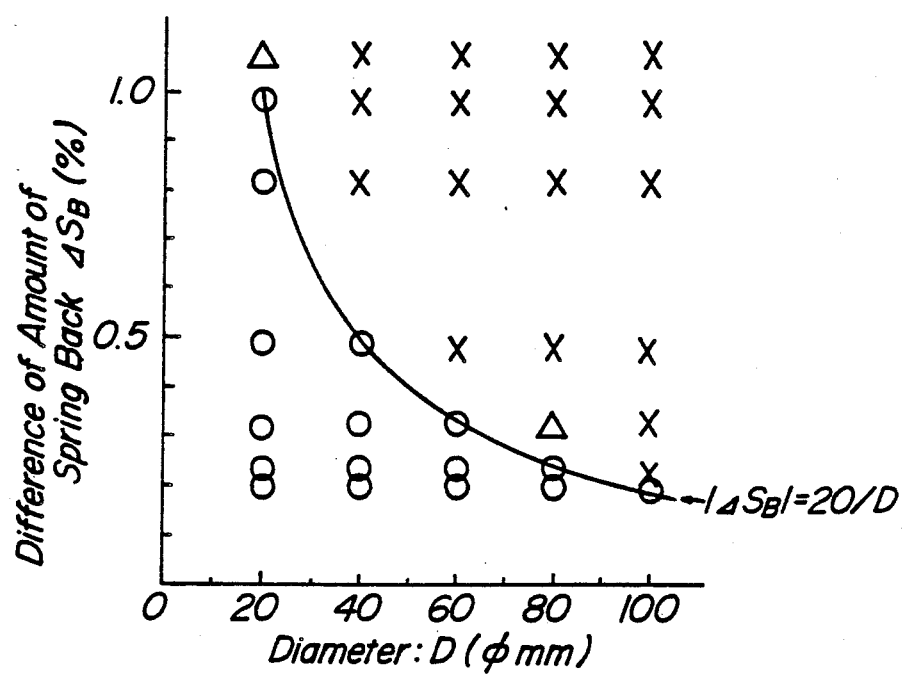
FIG_3

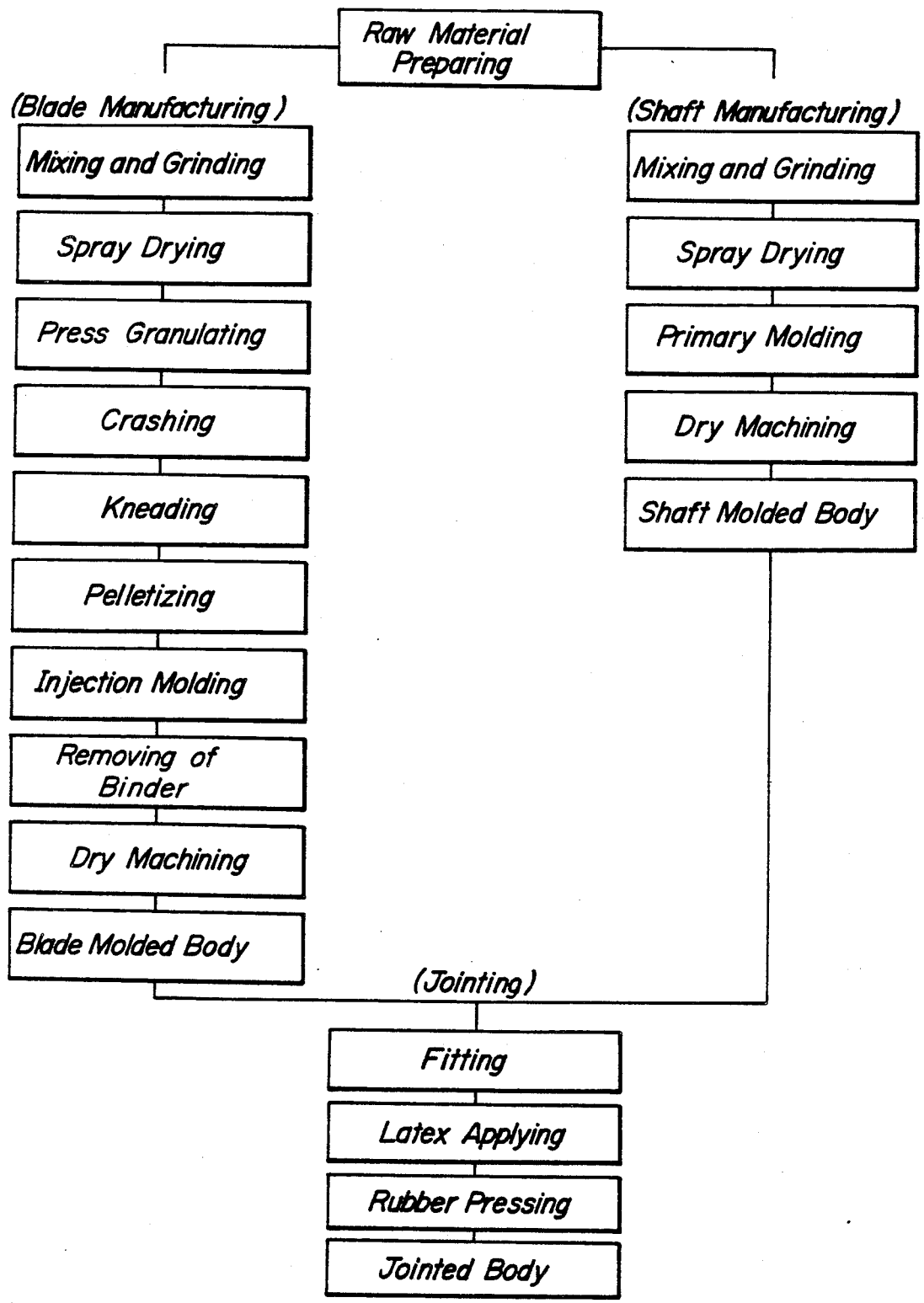
FIG_4

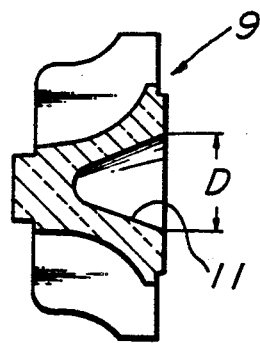
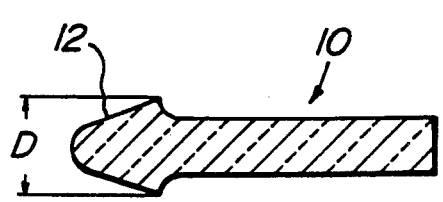
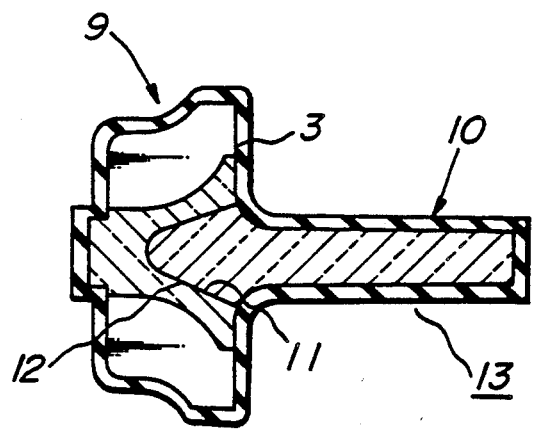
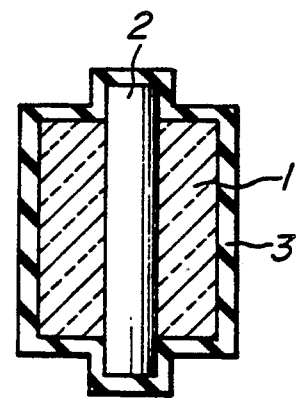

CERAMIC JOINED BODY

BACKGROUND OF THE INVENTION

1. Field of the Invention

The present invention relates to a ceramic jointed body consisting of different ceramic molded parts and having a large size and complicated configuration such as a turbine rotor.

2. Related Art Statement

Recently, research has been conducted for utilizing silicon ceramics in engine parts or the like, since silicon ceramics, such as silicon nitride, silicon carbide, sialon or the like, are more stable and less susceptible than metals to oxidation corrosion or creep deformation at high temperatures. For example, radial turbine rotors made of these ceramic materials are lighter and better in thermal efficiency, allowing the operating temperature of engines to be raised higher, as compared with metallic rotors, so that these are drawing attention as a turbocharger rotor, gas turbine rotor, etc. for automobiles.

However, since such a turbine rotor has complicated three-dimensional shaped blades, naturally it is almost impossible to finish by grinding a sintered body of simple shape such as a round rod, square rod or the like into a desired shape and also it is difficult to obtain such a ceramic body having a complicated configuration by only one molding operation.

Other than the above, injection molding methods have been extensively employed for molding the complicated ceramic bodies.

The method of injection molding ceramics is an application of the conventional injection molding method which has been used for molding plastics. Generally, in injection molding a ceramic body ceramic powder is mixed with an organic binder consisting of a binding agent such as polyethylene, polystyrene or the like, wax, and lubricant. The mixture is subsequently heated to plasticize it and then injection molded in a mold. The thus molded body is burned to remove the organic binder and is then isostatically pressed under hydrostatic pressure and sintered to obtain a ceramic sintered body.

It is very difficult to get a thick body by means of injection molding since in the case of injection molding thick bodies, cracks frequently occur in the bodies after removing the organic binder.

Therefore, there have been studies on the method of producing a ceramic turbine rotor in such a manner that a blade part having a complicated configuration and a rod shaped shaft part are individually molded, and subsequently the molded blade part and the molded shaft part are jointed together to obtain the ceramic molded turbine rotor. For example, Japanese Patent Application Laid-open Publication No. 57-88201 of the assignee of the present application discloses a method of producing a ceramic turbine rotor by individually molding the blade part and the shaft part and fitting these molded parts to each other with a ceramic paste interposed therebetween, and sintering the fitted parts to thereby integrally join them. Japanese Patent Application Laid-open Publication No. 61-111976 also discloses a jointed ceramic turbine rotor composed of ceramic molded blade and shaft parts, each of which has a joining portion of dimensions determined in a given relationship relative to each other so that the molded blade and shaft parts are fitted to each other and integrally jointed by sintering without applying a ceramic paste on the jointing surfaces thereof.

Such a ceramic molded blade part and a ceramic molded shaft part can be individually designed corresponding to the properties required for the blade part and the shaft part, respectively. For example, the shaft part can be designed so as to have a larger diameter at its jointing portion, thereby obtaining a jointed turbine rotor having a high mechanical strength sufficient to withstand a load at high rotating speeds of the rotor. Also, the shaft and blade parts can be designed such that the front end of the shaft part is not exposed on the front surface of the blade part. In this case, when the blade part and the shaft part are jointed, these parts can be urged toward each other by a high pressing force, thereby obtaining a good joint strength at the jointed portion. Moreover, the jointed portion between the blade part and the shaft part is not exposed to the atmosphere, so that when the rotor is subjected to an abrupt heat shock, an influence of the heat shock to the jointed portion can be released, and the jointed portion can be prevented from corrosion caused by hot gas.

However, the methods described in Japanese Patent Application Laid-open Publications Nos. 57-88201 and 61-111976 have the disadvantages that when the dimensions of the jointed body vary, a crack occurs sometimes near the jointing area of the jointed body before sintering. Such cracks are hereinafter called jointing cracks.

SUMMARY OF THE INVENTION

An object of the present invention is to provide a ceramic jointed body having no jointing cracks.

Thus, the inventors conducted various experiments and studies on the ceramic jointed body composed of different ceramic molded parts in another viewpoint different from the techniques described in Japanese Patent Application Laid-open Publications Nos. 57-88201 and 61-111976 and have found that a difference between "amounts of spring back" of the molded parts to be jointed influences producing the ceramic jointed body without occurrence of the jointing cracks.

In general, a compressed powder body has such properties that the powder body is inflated by an elastic deformation of compressed powder in a direction substantially opposite to a direction of an external force when the external force is released.

Thus, the "amount of spring back" means an amount of return (inflation volume) of the molded body when the powder compressing pressure is reduced to an atmospheric pressure. In the present invention, the "amount of spring back" is calculated by the following formula. It should be noted that an iron core is used in the formula, but a core of other material can be used instead of the iron core.

$$\text{Amount of spring back (\%)} = \frac{\text{inner diameter of molded body} - \text{outer diameter of iron core}}{\text{outer diameter of iron core}} \times 100$$

In the present invention, as shown in FIG. 6, a ceramic molded body 1 having an outer diameter of 25 mm($\phi$), an inner diameter of 10 mm($\phi$) and a height of 20 mm is molded and an iron core 2 having an outer diameter of 10 mm($\phi$) is extended through the center of the molded body. The outer surfaces of the molded body and the iron core ends extended from the ends of the molded body are applied with LATEX 3. After isostatic pressing of 7 ton/cm$^2$ (by a rubber press), the iron core 2 is withdrawn. Then, the inner diameter of the molded bodies is measured, and the amount of the spring back is emperically calculated. The "amount of spring back" can be adjusted by properly selecting the composition of the ceramic raw material, shape of particles and method of molding.

Thus, the inventors have found that when the difference between the "amounts of spring back" of the molded parts does not satisfy the specified relation, jointing cracks occur. Conversely, when the difference between the "amounts of spring back" of the molded parts satisfies the specified relation, jointing cracks do not occur.

According to the present invention, a ceramic jointed body is composed of two molded bodies which are individually molded by different methods, respectively, and integrally jointed by isostatic pressing so that a difference between "amounts of spring back" of the two molded bodies satisfies the following formula.

$$|\Delta S_B| \leq \frac{20}{D}$$

wherein $\Delta S_B$: difference between "amounts of spring back" of two molded bodies (%)

D : maximum diameter of jointing surface (mm).

The "maximum diameter of jointing surface" herein practically means as follows:

(a) When the jointing surface is a circular plane or an ellipsoidal plane, the "maximum diameter of jointing surface" is the diameter or long diameter thereof.

(b) When the jointing surface is a curved surface of a circular cone, ellipsoidal cone, or round headed cone, the "maximum diameter of jointing surface" is the maximum diameter of the cross-sectional area of said the cone, where the cross-sectional plane is perpendicular to the central axis of the cone.

In the present invention, when two ceramic bodies to be jointed are molded by different molding methods, respectively, the difference between "amounts of spring back" of the two molded bodies is controlled so as to satisfy the above formula. The jointing surfaces of the molded bodies to be jointed are preferably machined, and then the molded bodies are fitted to each other at the jointing surfaces thereof and integrally jointed by isostatic pressing (by means of rubber press), thereby obtaining a jointed body without occurrence of jointing cracks.

The combinations of two molded bodies to be jointed according to the present invention may be combinations of: an injection molded body and a press molded body; an injection molded body and a slip cast molded body; an injection molded body and an extrusion molded body; a slip cast molded body and a press molded body.

As mentioned above, the present invention is characterized in that the two molded bodies to be jointed are molded such that the difference between "amounts of spring back" of the two molded bodies satisfies the following specified relationship, $$|\Delta S_B| \leq \frac{20}{D}$$

wherein $\Delta S_B$: difference between "amounts of spring back" of two molded bodies (%)

D : maximum diameter of jointing surface (mm)

If the difference between the "amounts of spring back" of the molded bodies to be jointed is more than 20/D, a stress in the jointed body becomes larger than the strength of the molded bodies or jointed body, resulting in occurrence of cracks. The strength of the molded body varies somewhat dependent on the thickness of the molded body or the hydrostatic pressure of isotropic pressing and is about 5 kg/mm$^2$ in JIS four points bending strength.

The ceramic raw material used in the present invention may be silicon nitride, silicon carbide, partially stabilized zirconia, sialon or other materials which produce these ceramic raw material by firing. These materials are used by properly selection in response to the characteristics required of the jointed body.

The isostatic pressing for integrally jointing is carried out according to a conventional manner. The hydrostatic pressure can be properly selected so as to effect compression of the ceramic molded bodies to thereby provide an integrated ceramic jointed body effectively pressed and jointed at the jointing surfaces of the ceramic molded bodies. The hydrostatic pressure is generally applied in a range of 1-10 ton/cm$^2$, preferably 2-8 ton/cm$^2$.

The invention will be now described more in detail with reference to the accompanying drawings.

BRIEF DESCRIPTION OF THE DRAWINGS

FIG. 2 is a cross-sectional view of a cylindrical jointed body according to an embodiment of the present invention;

FIG. 3 is a graph showing results of jointing various molded bodies;

FIG. 4 is a blocked flow sheet showing an embodiment of steps of producing a jointed body composed of a blade part and a shaft part;

FIGS. 5a-5c are sectional views illustrating steps of producing a jointed body composed of a blade pat and a shaft part according to the present invention; and FIG. 6 is a sectional view illustrating a method of measuring an "amount of spring back" of a molded body.

DESCRIPTION OF THE PREFERRED EMBODIMENTS

EXAMPLE 1

Figure 1:
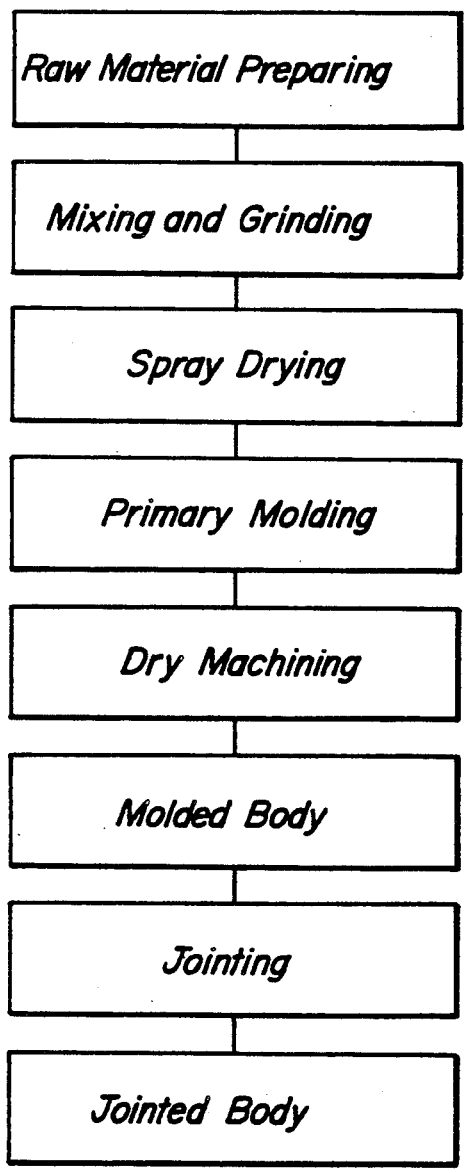
FIG. 1 is a blocked flow sheet showing an embodiment of steps of producing a cylindrical jointed body according to the present invention.

A method of producing a jointed body composed of two different kinds of molded bodies will now be described by referring the flow sheet in FIG. 1 showing the steps of producing a jointed body composed of two molded bodies having a simple configuration such as a cylindrical shape.

100 parts by weight of silicon nitride ($Si_3N_4$) as ceramic raw material and 2 parts by weight of SrO, 3 parts by weight of MgO and 3 parts by weight of CeO as the sintering aids were mixed and ground to an average particle diameter of 0.5-3 $\mu$m, and powder of average particle diameter of 10-100 $\mu$m was obtained by spray drying. The powder was isostatically pressed by a hydrostatic pressure of 5 ton/cm$^2$ for 30 seconds to obtain primary molded bodies, and these bodies were machined to obtain individual cylindrical molded bodies 4 and 5 as shown in FIG. 2. These molded bodies were worked so as to be fitted at their jointing surfaces 6 and 7 to each other. The outer surface of fitted molded bodies was coated with LATEX 3 and isostatically pressed by a hydrostatic pressure of 7 ton/cm² for 30 seconds to obtain a jointed body 8 composed of two cylindrical bodies.

In this example, the two cylindrical molded bodies to be jointed were molded as different molded bodies having different "amounts of spring back", respectively, by varying in particle size and specific surface area of the ceramic raw material from each other.

According to the aforementioned method, thirty five kinds of samples with five kinds of jointing surfaces having combinations of diameter and height of 20 mmφ×30 mm, 40 mmφ×30 mm, 60 mmφ×30 mm, 80 mmφ×30 mm, and 100 mmφ×30 mm and seven kinds of differences between "amounts of spring back" at each diameter were produced. The properties of the samples are shown in Table 1 and FIG. 3.

TABLE 1

| Diameter of jointing surface: D (mm) | $\frac{20}{D}$ | Difference between "amounts of spring back" ($\Delta S_B$) (%) | | | | | | |
|---|---|---|---|---|---|---|---|---|
| | | 0.20 | 0.24 | 0.33 | 0.49 | 0.82 | 0.99 | 1.08 |
| 20 | 1.0 | ○ | ○ | ○ | ○ | ○ | ○ | △ |
| 40 | 0.5 | ○ | ○ | ○ | ○ | x | x | x |
| 60 | 0.33 | ○ | ○ | ○ | x | x | x | x |
| 80 | 0.25 | ○ | ○ | △ | x | x | x | x |
| 100 | 0.20 | ○ | x | x | x | x | x | x |

(Note)
○: non crack
△: crack sometimes occurs
x: crack occurs

It is seen from the results shown in Table 1 and FIG. 3 that when two molded bodies to be jointed satisfy the following relationship, cracks do not occur in the jointed body.

$$|\Delta S_B| \leq \frac{20}{D}$$

wherein $\Delta S_B$: difference between "amounts of spring back" of two molded bodies (%)

D : maximum diameter of jointing surface (mm).

EXAMPLE 2

A ceramics jointed body having a complicated configuration such as a turbine rotor was produced. In this example, a blade part of complicated configuration was molded by injection molding, while a shaft part was molded by press molding, and these parts were jointed into a jointed body.

Firstly, a method of producing the blade part will be described by referring to the flow diagram shown in FIG. 4.

100 parts by weight of silicon nitride powders as ceramic raw material and 2 parts by weight of SrO, 3 parts by weight of MgO and 3 parts by weight of CeO₂ as sintering aids were mixed and ground to an average particle diameter of 0.5 μm, and then granular powder was obtained by spray drying the ground mixture. The granular powder was isostatically pressed by a hydrostatic pressure into a block shape and then crushed to obtain powder of an average particle diameter of 30 μm. To 100 parts by weight of thus prepared powder were added 3 parts by weight of a binder, 15 parts by weight of a plasticizer and 2 parts by weight of talc, and then the mixture was kneaded to obtain a kneaded material. This kneaded material was pelletized by means of an extruder and subsequently injection molded to produce a primary molded body of the blade part of a radial turbine wheel. The primary molded body was heated to a temperature of 400° C. at a heat-up rate of 1°-3° C./hr and kept at 400° C. for five hours to remove the binder. The thus treated molded body was dry machined, and a blade part molded body 9 as shown in FIG. 5a was obtained.

A portion of the blade part molded body 9 was used as a test sample to measure the "amount of spring back".

Next, a method of producing the shaft part will be described by referring to the flow diagram shown in FIG. 4.

The same ceramic raw material and sintering aids as those of the blade part were used. The ceramic raw material and sintering aids were mixed and ground to an average particle diameter of 0.5-3 μm. Then, several kinds of powders having different average particle diameters in a range of 10-100 μm were prepared by spray drying the ground mixture. The "amounts of spring back" of the prepared powders were measured, and a powder providing a difference of spring back to the blade part of at most 20/D was selected. The thus selected powder was then isostatically pressed by hydrostatic pressures of 0.7 ton/cm² and 1.0 ton/cm² for 30 seconds to obtain a primary molded body. The primary molded body was dry machined to obtain a shaft part molded body 10 as shown in FIG. 5b.

The blade part molded body 9 and shaft part molded body 10 were further machined so as to be fitted at the jointing surfaces 11 and 12 without a gap between these surfaces, and fitted at the jointing surfaces 11 and 12 as shown in FIG. 5c. The two molded bodies fitted to each other were coated with LATEX 3 applied on the whole outer surface thereof and then isostatically pressed by a hydrostatic pressure of 7 ton/cm² for 30 seconds to compact the molded bodies themselves and to closely contact the fitted jointing surfaces 11 and 12 to each other. Thus, a jointed turbine rotor 13 composed of two ceramic molded bodies was obtained.

It is shown in FIG. 5c that since the jointed body (fitted body) composed of the blade part molded body 9 and shaft part molded body 10 is air tightly covered by LATEX 3, the jointed body is effectively pressed and compressed from all directions by the isostatic pressing. Also, the jointing surfaces are effectively closely contacted to provide an integrated construction.

The properties of the jointed bodies (samples 1 and 2) produced by the aforementioned method of the present invention and a jointed body of a comparative example 3 are shown in Table 2.

TABLE 2

| Sample | Maximum diameter at jointing portion: D (mmφ) | $\frac{20}{D}$ | Difference between "amounts of spring back" of shaft and blade part molded bodies ($\Delta S_B$) (%) | Result of joint |
|---|---|---|---|---|
| Invention 1 | 40 | 0.5 | 0.45 | ○ |
| Invention 2 | 80 | 0.25 | 0.15 | ○ |
| Comparative example 3 | 60 | 0.33 | 0.45 | x |

(Note)
○: non crack
x: crack occurs

It is seen from the results shown in Table 2 that when the jointed bodies satisfy the following relationship, jointed bodies without the occurrence of cracks can be obtained.

$$|\Delta S_B| \leq \frac{20}{D}$$

wherein $\Delta S_B$: difference between "amounts of spring back" of two molded bodies (%)

D : maximum diameter of jointing surface (mm).

What is claimed is:

1. A ceramic jointed body including two molded bodies which have been molded by different forming methods and integrally joined by isostatic pressing, a difference between an amount of springback of said molded bodies satisfying the following formula:

$$|\Delta S_B| \leq \frac{20}{D}$$

wherein $\Delta S_B$ is the difference between the amount of springback (%) of said molded bodies and D is a maximum diameter (mm) of a jointing surface between said molded bodies.

2. The ceramic jointed body of claim 1, wherein the molded bodies to be jointed are selected from the group consisting of: an injection molded body and a press molded body; an injection molded body and a slip cast molded body; an injection molded body and an extrusion molded body; and a slip cast molded body and a press molded body.

3. The ceramic jointed body of claim 1, wherein said molded bodies are a blade part and a shaft, respectively, of a ceramic turbine wheel.

* * * * *